United States Patent
Nordstrom et al.

(10) Patent No.: US 10,394,759 B2
(45) Date of Patent: Aug. 27, 2019

(54) SYSTEM AND METHOD TO CONFIGURE DISTRIBUTED MEASURING DEVICES AND TREAT MEASUREMENT DATA

(71) Applicant: AirMagnet, Inc., Santa Clara, CA (US)

(72) Inventors: Ross D. Nordstrom, Colorado Springs, CO (US); Kevin T. Burbach, Colorado Springs, CO (US)

(73) Assignee: AirMagnet, Inc., Santa Clara, CA (US)

( * ) Notice: Subject to any disclaimer, the term of this patent is extended or adjusted under 35 U.S.C. 154(b) by 339 days.

(21) Appl. No.: 15/069,736

(22) Filed: Mar. 14, 2016

(65) Prior Publication Data

US 2017/0262460 A1    Sep. 14, 2017

(51) Int. Cl.
| | |
|---|---|
| G06F 17/30 | (2006.01) |
| G06F 16/13 | (2019.01) |
| H04L 12/24 | (2006.01) |
| H04L 29/08 | (2006.01) |
| H04L 12/26 | (2006.01) |
| G06F 16/14 | (2019.01) |
| G06F 11/30 | (2006.01) |
| G06F 11/34 | (2006.01) |
| G06F 11/32 | (2006.01) |

(52) U.S. Cl.
CPC .......... *G06F 16/13* (2019.01); *G06F 11/3006* (2013.01); *G06F 11/3058* (2013.01); *G06F 11/3082* (2013.01); *G06F 11/3086* (2013.01); *G06F 11/323* (2013.01); *G06F 11/3409* (2013.01); *G06F 11/3495* (2013.01); *G06F 16/156* (2019.01); *H04L 41/0631* (2013.01); *H04L 41/08* (2013.01); *H04L 43/045* (2013.01); *H04L 43/50* (2013.01); *H04L 67/1097* (2013.01)

(58) Field of Classification Search
CPC ...................................................... G06F 17/30
USPC ............................................................ 714/32
See application file for complete search history.

(56) References Cited

U.S. PATENT DOCUMENTS

| | | | |
|---|---|---|---|
| 7,673,290 B1 | 3/2010 | Kothandapani et al. | |
| 8,024,348 B2 * | 9/2011 | Kenedy .................. | G16H 50/30 707/759 |

(Continued)

OTHER PUBLICATIONS

Extended European Search Report for European Patent Application No. 17160647.8, dated Jul. 24, 2017.

*Primary Examiner* — Kim T Nguyen
(74) *Attorney, Agent, or Firm* — Locke Lord LLP; Scott D. Wofsy; Christopher J. Capelli (57) ABSTRACT

A method to configure a measuring device is provided. In other aspects, a server and a non-transitory computer readable storage medium are provided. The method includes receiving a configuration request that specifies configuration criteria for configuring a measuring device to perform a test, wherein the configuration criteria includes configuration instructions, analysis instructions, and visualization instructions, and configuring the measuring device to perform measurements and output measurement data in accordance with the configuration instructions. The method further includes receiving the measurement data output by the measuring device, storing the measurement data received, processing the measurement data stored based on the analysis instructions, and outputting visualization data corresponding to the processed measurement data to a display device based on the visualization instructions.

15 Claims, 5 Drawing Sheets

(56) References Cited

U.S. PATENT DOCUMENTS

| | | | | |
|---|---|---|---|---|
| 8,224,835 B2* | 7/2012 | Kenedy | ................ | G16H 50/30 |
| | | | | 707/759 |
| 8,239,436 B2* | 8/2012 | Perez | ................ | G06F 17/17 |
| | | | | 382/100 |
| 8,533,687 B1 | 9/2013 | Greifeneder et al. | | |
| 8,600,809 B1* | 12/2013 | Kubica | ................ | G06Q 30/02 |
| | | | | 705/14.41 |
| 8,788,882 B2* | 7/2014 | Schroeder | ............ | G06F 11/263 |
| | | | | 714/32 |
| 8,984,342 B2* | 3/2015 | Rupp | ................ | H04W 24/08 |
| | | | | 714/33 |
| 9,013,205 B2* | 4/2015 | Chen | ................ | G06F 11/273 |
| | | | | 324/537 |
| 2009/0299940 A1 | 12/2009 | Hayes et al. | | |
| 2012/0198279 A1* | 8/2012 | Schroeder | ............ | G06F 11/2294 |
| | | | | 714/32 |
| 2013/0054792 A1 | 2/2013 | Sharaf | | |
| 2013/0124669 A1 | 5/2013 | Anderson et al. | | |
| 2014/0250330 A1* | 9/2014 | Duale | ................ | G06F 11/3692 |
| | | | | 714/37 |

* cited by examiner

SYSTEM AND METHOD TO CONFIGURE DISTRIBUTED MEASURING DEVICES AND TREAT MEASUREMENT DATA

FIELD OF THE INVENTION

The present disclosure relates to configuration of distributed measuring devices and treatment of measurement data, and in particular to a social platform for sharing configuration criteria and output measurement data.

BACKGROUND OF THE INVENTION

Currently in the art, engineers, such as network support engineers, have access to limited options for remotely configuring measuring devices that measure network characteristics. When the limited configuration options are not adequate, the measuring devices can be configured manually. Additionally, aggregation of data generated by measuring devices is limited due to access and compatibility issues. While this approach may have been considered adequate until the present time, there is a need for flexibility in configuration of measuring devices and treatment of measurement data output by the measuring devices, and expanded collaboration in sharing configuration information and treatment of measurement data.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a server having at least one processing device is provided. The processing device is configured to receive a configuration request that specifies configuration criteria for configuring a measuring device to perform a test. The configuration criteria include configuration instructions, analysis instructions, and visualization instructions. The processing device is further configured to configure the measuring device to perform measurements and output measurement data in accordance with the configuration instructions, receive the measurement data output by the measuring device, store the measurement data received, process the measurement data stored based on the analysis instructions, and output visualization data corresponding to the processed measurement data to a display device based on the visualization instructions.

In another aspect, a method is provided to configure a measuring device. The method includes receiving a configuration request that specifies configuration criteria for configuring a measuring device to perform a test, wherein the configuration criteria includes configuration instructions, analysis instructions, and visualization instructions, and configuring the measuring device to perform measurements and output measurement data in accordance with the configuration instructions. The method further includes receiving the measurement data output by the measuring device, storing the measurement data received, processing the measurement data stored based on the analysis instructions, and outputting visualization data corresponding to the processed measurement data to a display device based on the visualization instructions.

In a further aspect, a non-transitory computer readable storage medium and one or more computer programs embedded therein are provided. The computer programs include instructions, which when executed by a computer system, cause the computer system to receive a configuration request that specifies configuration criteria for configuring a measuring device to perform a test, wherein the configuration criteria include configuration instructions, analysis instructions, and visualization instructions. The instructions further, when executed, cause the computer system to configure the measuring device to perform measurements and output measurement data in accordance with the configuration instructions, receive the measurement data output by the measuring device, store the measurement data received, process the measurement data stored based on the analysis instructions, and output visualization data corresponding to the processed measurement data to a display device based on the visualization instructions.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present disclosure is now described more fully with reference to the accompanying drawings, in which an illustrated embodiment of the present disclosure is shown. The present disclosure is not limited in any way to the illustrated embodiment as the illustrated embodiment described below is merely exemplary of the disclosure, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present disclosure. Furthermore, the terms and phrases used herein are not intended to be limiting but rather to provide an understandable description of the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this disclosure as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below.

Figure 1:
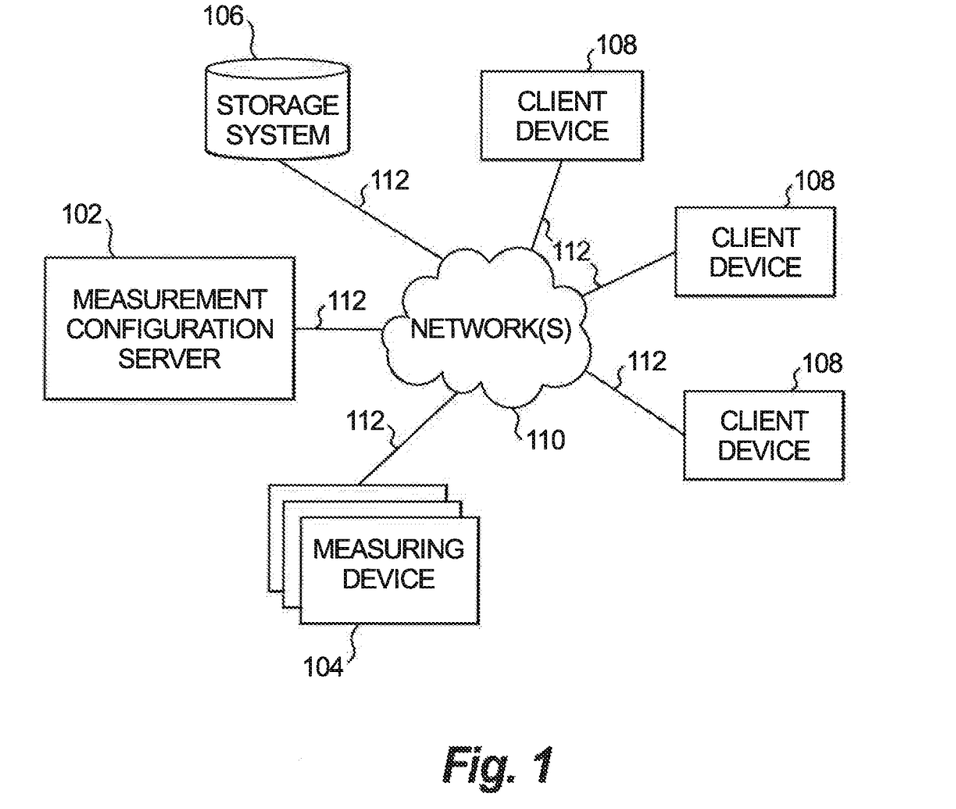
FIG. 1 illustrates a block diagram of an exemplary measurement configuration system in accordance with illustrative embodiments of the present disclosure.

Turning now descriptively to the drawings, in which similar reference characters denote similar elements throughout the several views, FIG. 1 depicts a block diagram of an exemplary measurement configuration system 100 in which illustrated embodiments of the present disclosure may be implemented.

FIG. 1 shows the measurement configuration system 100 includes an exemplary measurement configuration server 102 in communication with a plurality of measuring devices 104, a storage system 106, and a plurality of client devices 108. Communication between the measurement configuration server 102 and the measuring devices 104, storage system 106, and client devices 108 can be direct or via one or more networks 110, such as a LAN, WAN, intranet or the Internet using communication links 112. The communication links 112 can be wired, wireless, or a combination thereof.

The measurement configuration server 102 includes one or more computing devices that execute programmable software modules for performing operations including receiving a configuration request from a client device 108 to configure at least one measuring device 104, configuring the measuring device to perform measurements and output measurement data in accordance with the configuration request, receiving measurement data output by the measuring device in accordance with the configuration request, processing the measurement data in accordance with the configuration request, and configuring the processed measurement data for display in accordance with the configuration request.

The measuring devices 104 and client devices 108 include storage devices that store programmable instructions and computing devices that execute the programmable instructions in accordance with performance of methods of the disclosure as described. The measuring devices 104 can include sensors and/or computing devices that measure properties or characteristics and generate measurement data.

Examples of measuring devices 104 include network measurement tools, such as that measure network performance metrics, such as throughput, round-trip-time (RTT), frames per second (f/s); measurement tools that measure environmental and physical properties such as temperature, humidity, pressure, velocity, acceleration, properties of light and sound; measurement tools that measure system properties such as memory usage, central processing unit (CPU) utilization, network interface information, internal temperature, etc. The measuring devices 104 can be stationary, portable, and/or mobile. In embodiments, one or more of the measuring devices 104 can be virtual measuring devices. In embodiments, the measuring devices 104 can be web crawlers or bots that move through one or more networks being monitored and detect and measure or use characteristics of information transmitted via the network(s) being monitored, such as addresses, content, data rates, etc. Characteristics of content that can be measured can include, for example, occurrence of selected words, images, colors, etc.

Examples of client devices 108 include stationary or mobile computing devices such as personal computers, tablets, and smartphones. The client devices 108 include user input devices for a user to enter a configuration request and display devices to display visualization results, such as in a graphical user interface (GUI). User input can be acquired, for example, via user input via a GUI using a mouse, keyboard, touch screen, etc.

Figure 2:
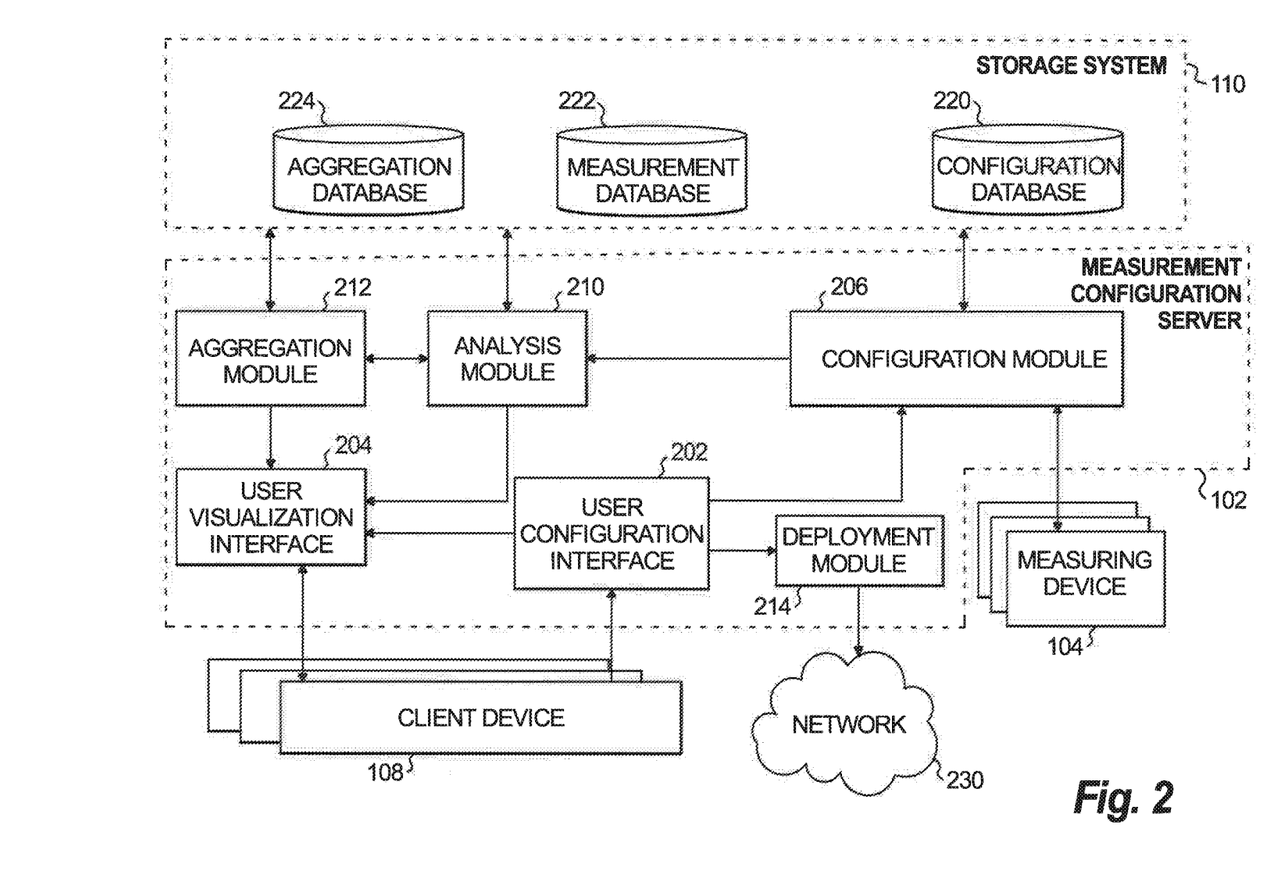
FIG. 2 illustrates a flow diagram of an embodiment of the measurement configuration system illustrated in FIG. 1 in accordance with illustrative embodiments of the present disclosure.

Referring to FIG. 2, an exemplary flow diagram is shown between software modules executed by the one or more processing devices of the measurement configuration server 102 and the measuring devices 104, the storage system 106, and the client devices 108. The measurement configuration server 102 accesses and executes software modules, which can include, for example, a user configuration interface 202, a user visualization interface (UI) 204, a configuration module 206, an analysis module 210, an aggregation module 212, and a deployment module 214.

The storage system 106 includes storage devices to store data and one or more processing devices for executing a management system to store, access, update, retrieve, and otherwise manage the data being stored. The storage system 106 can include one or more databases, such as a configuration database 220, a measurement database 222, and an aggregation database 224 that use the same or separate management systems for managing data.

The user configuration interface 202 receives configuration requests transmitted from client devices 108. The configuration request identifies one or more measuring devices 104 and can include configuration criteria having at least one of configuration instructions, deployment instructions, pre-analysis instructions, analysis instructions, visualization instructions, and/or aggregation instructions. The user configuration interface 202 can provide feedback to the user when the measuring devices 104 are configured. The configured measuring devices 104 can be activated to start or end performance of a test by a user action or automatically, such as in response to a condition (e.g., scheduled times, amount of measurement data generated, content of measurement data generated, etc.)

The user visualization interface 204 receives visualization data and/or alert data from the analysis module 210 and/or aggregation module 212 and provides the visualization and/or alert data to the client devices 108. The alert data instructs the client device 108 to issue an alert notification, such as an audio, displayable, or vibratory alert notification.

The user configuration interface 202 and the user visualization interface 204 can include an application program interface (API) that provides an interface between the measurement configuration server 102 and the client devices 108. Using the API, the user configuration interface 202 can interact with the configuration database 220 to store, access, update, and retrieve configuration requests, and with the configuration module 206 to provide configuration request identification to the configuration module 206 so that the configuration module 206 can access a corresponding configuration request from the configuration database 220. Using the API, the user visualization interface 204 can provide visualization data to the client device 108 in response to a configuration request by interacting with the storage system 106 to access the corresponding configuration request, the measurement database 222 and aggregation database 224, the analysis module 210, and aggregation module 212, to access data to be included in the visualization data.

The configuration module 206 can be for example a software module, such as an API, that accesses configuration data from the configuration database 220 and uses the accessed configuration data to configure, provision, and instruct the measuring devices 104. The configuration module 206 can receive from the user configuration interface notification and identification of a received configuration request and accesses the associated configuration instructions from the configuration database 220. Alternatively, the configuration module 206 can receive the configuration instructions from the user configuration interface 202.

The configuration module 206 communicates with the measuring devices 104, including uploading to a measuring device 104 specified in a communication request a configuration script specified by configuration instructions included in the configuration request. The configuration script can be included in or identified by the configuration request. The configuration module 206 can access the identified configuration script from the configuration database 220.

In addition, the configuration module 206 receives measurement data output by the measuring device 104 and performs pre-analysis processing to the measurement data in accordance with pre-analysis instructions included in the communication request.

The configuration script specified by the configuration instructions can include programmable instructions which, when executed by the processing device of the measuring device 104, configure the measuring device 104 to perform operations. Operations to be performed by the measuring device 104 can include detecting and/or measuring at least one property and outputting corresponding measurement data. A property being measured can include, for example, a physical property (e.g., temperature, current, pressure, etc.) or a characteristic of data (e.g., data content, network traffic metrics, etc.) or a characteristic of the computing environment (e.g., memory usage, CPU utilization, wireless interference, etc.). The measurement data can be output in a predetermined format that can be parsed and processed by the measurement configuration server 102. Examples of formats for measurement data output by the measuring device 104 include a format that uses a JSON data structure having key-value pairs. Each key-value pair can include a description of the property that was measured paired with the corresponding measurement value (e.g. {"temperature": 72, "humidity": 0.57}). In the case of failure, the data structure can also be used for troubleshooting and debugging by including verbose details of a malfunction incident (e.g., {"temperature": 73, "humidity": null, "sensorFailure": "Humidity Failure: Sensor GPIO pin 4 is disconnected" }). Additional constraints to the predetermined format can include, for example, using only simple key/value objects, use of nested objects is forbidden, outputting numeric values only, using predetermined naming conventions for metrics being measured, etc.

The pre-analysis instructions can specify fields of the measurement data to process and/or store, wherein unspecified fields of the measurement data can be ignored. For example, the measuring device 104 may be a virtual probe installed on a network that can detect source and/or destination addresses, however the analysis instructions specify processing only source address information, but ignoring destination address information. In this case, only the source address information will be analyzed and stored. Additionally, the pre-analysis instructions can specify statistical aggregation of measurement data to perform before the measurement data is stored in the measurement database 222. For example, the statistical aggregation can specify determining during pre-analysis a minimum, maximum, mean, 3 dB level, or 6 dB level per a specified interval, wherein the interval can be specified as a time or frequency interval. The results of the pre-analysis generated by the configuration module 206 can be stored in the measurement database 222 without storing the raw measurement data output by the by the measuring device 104. Alternatively, both the pre-analysis results and the raw measurement data can be stored in the measurement database 104.

The configuration module 206 can store in the measurement database 222 the pre-analysis results and/or the raw measurement data received from the measuring devices 104.

The analysis module 210 analyzes measurement data output by the measuring devices 104 based on analysis instructions, and generates visualization data for displaying the analysis or aggregation results based on visualization instructions and/or alerts based on the alert instructions. As measurement data is generated by a measuring device 104 in response to a configuration request, the corresponding measurement data is accessed from the measurement database 222 (via the first API 204), analyzed, aggregated, and prepared for visualization based on the analysis instructions and visualization instructions included in the configuration request.

The analysis instructions can specify, for example, particular fields of the measurement data to process and mathematical and/or statistical algorithms to use for processing the measurement data. The visualization instructions can specify, for example, which measurement data to display, how to display them, which graphical characteristics to use (e.g., graph types, layout, color), and which numerical statistics to display (e.g., max, min, mean).

The analysis module 210 further detects alert conditions associated with measurement data and/or analysis results determined from the measurement data using alert instructions specified in the corresponding configuration request. When an alert condition is detected, a visual indicator can be included with corresponding visualization data so that the client device 108 will display an alert indicator. Alternatively, the alert indicator can output to the client device 108 as an audio or vibratory indicator that will cause the client device 104 to generate an auditory or vibratory alert.

The aggregation module 212 aggregates measurement data generated from tests performed by the measuring devices 104. Aggregation can be performed, for example, based on users, attributes associated with the configuration requests, measuring devices 104 used, etc. The user configuration interface 202 can provide a GUI that indicates aggregation results available. The aggregation results can be updated periodically or in real time to incorporate measurement data that is received from measuring devices 104. Users can select from available aggregation results or generate aggregation requests to aggregate measurement data. The aggregation requests can include aggregation instructions and visualization instructions.

The aggregation instructions can specify attributes of measurement data and results of processing performed on measurement data to include in the aggregation and analysis operations to perform on the data included in the aggregation. Inclusion of measurement data can be based on attributes associated with configuration requests used to perform tests that generated the measurement data, attributes associated with the test, and/or attributes associated with measurement data. Examples of configuration request attributes include title, icon, picture, description, author, date entered, tag, and label. Examples of test attributes include date/time performed, measuring devices 104 used, location performed, and user that activated the test. Examples of measurement data attributes include identification of the associated measuring device 104, attribute(s) of the measuring device 104 (e.g., manufacturer, property it measures, etc.), location of the measuring device 104, date/time stamps associated with the measurement data, and measurement data content. Authors and users can be specified based on attributes, such as profession, employer, country/place of residence, gender, race, age, etc.

The aggregation request can also specify a comparison operation in which a first and second set of data are compared and the results are visualized. The first and second sets of data can be measurement data or aggregation data and can be selected based on attributes associated with the measurement data or aggregation data and/or the configuration requests or aggregation requests used to generate the data sets.

The aggregation visualization instructions can provide instructions to the UI interface 202 for generating visualization data for displaying aggregation results. The aggregation visualization instructions can specify, for example, which aggregation results to display and how to display the aggregation results, such as layout, which graphical characteristics to use (e.g., graph types, layout, color), and which numerical statistics to display (e.g., max, min, mean).

The deployment module 214 can deploy a measuring device 104 in accordance with received deployment instructions. The deployment module 214 can receive from the user configuration interface notification and identification of a received configuration request that includes deployment instructions and accesses the associated deployment instructions from the configuration database 220. Alternatively, the configuration module 206 can receive the deployment instructions from the user configuration interface 202.

The deployment instructions can specify where (e.g., a location on a network 230 being monitored) to deploy a virtual measuring device 104. The deployment module 216 can deploy a measuring device 104 on network 108 based on the deployment instructions.

The analysis module 210, aggregation module 212, and deployment module 214 can interact with the storage system 106 to access identified configuration and/or aggregation requests from the configuration database 220, store, access, update, and retrieve measurement data from the measurement database 222, and store, access, update, and retrieve aggregation results from the aggregation database 224.

Accordingly, the disclosure provides a system and method for an individual to configure a measuring device 104 to perform a test; perform customized pre-analysis, storage, and analysis of measurement data; perform aggregation of measurement data; and provide customized visualization of the results. The user configuration interface 202 can allow a user to upload to the configuration database 220 and the measuring device 104 a configuration request that was generated or obtained by the user independent of the measurement configuration server 102. In addition, the user configuration interface 202 can provide a GUI to the user to browse through different configurations requests and instructions (e.g., configuration, deployment, pre-analysis, analysis, visualization, and/or summary instructions) to select and/or compose a configuration request. Once selected, the user can modify the configuration request. Users can upload modified or new configuration requests to the configuration database 220 for use by others or for use by only a specified one or more users.

Users can specify attributes to associate with a configuration request they added to the configuration database 220, such as a title, icon, picture, description, author, date entered, tag, or label. The attributes can be associated to the configuration request as, for example, metadata. These attributes can be used to search, sort, and/or affect display of entries in the configuration database 220.

In addition, users can browse, search, and select measurement data results stored in the measurement database 222 and aggregation requests and aggregation results stored in the aggregation database 224. Users can modify selected aggregation requests or generate new aggregation requests, and store these to the aggregation database 224. The user configuration interface 202 can provide a GUI to the user to browse through the measurement database 222 and the aggregation database 224 to select measurement data, aggregation requests, or aggregation results and/or compose an aggregation request. Once selected, the user can modify an aggregation request. Users can upload modified or new aggregation requests to the aggregation database 224 for use by others or for use by only a specified one or more users.

Users can specify attributes to associate with an aggregation request they added to the configuration database 220, such as a title, icon, picture, description, author, date entered, tag, or label. The attributes can be associated to the aggregation request as, for example, metadata. These attributes can be used to search, sort, and/or affect display of entries in the aggregation database 224.

Figure 3:
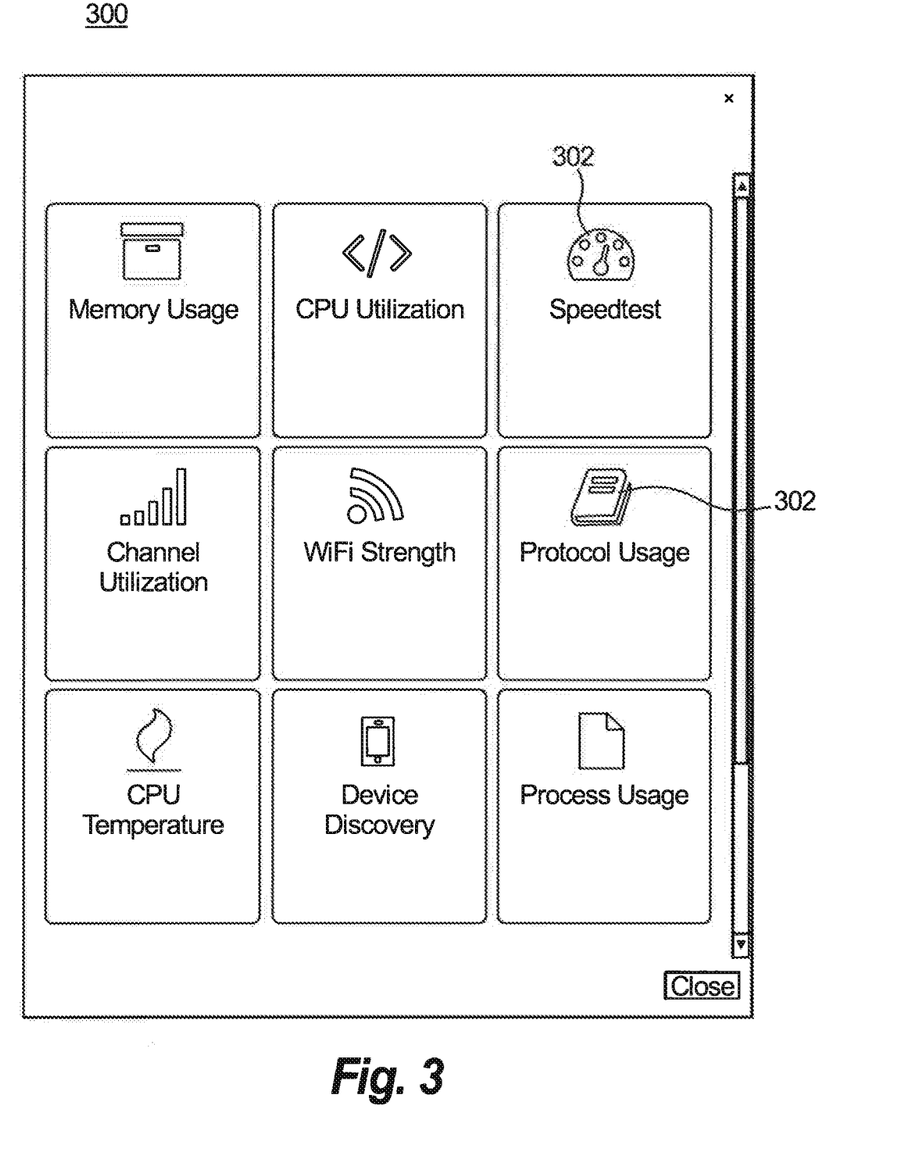
FIG. 3 illustrates an example screenshot displayed by a client device of the measurement configuration system illustrated in FIG. 1 in accordance with illustrative embodiments of the present disclosure.

FIG. 3 shows an example screenshot 300 of a GUI provided to a client device 108 for browsing the configuration database 220. The view shown in the screenshot 300 shows a palate of icons 302 associated with network performance testing. Each icon 302 represents a category of network performance tests to perform. In response to a user selecting an icon 302, a menu of available configuration requests and associated instructions can be provided, from which the user can select or use to compose a configuration request. The user can identify one or more measuring devices 104 to which the configuration request is to be applied, and activate a test of the measuring device(s) 104 in accordance with the selected configuration request by activating (e.g., "clicking") a link associated with the configuration request.

The user configuration interface 202 can provide a GUI that allows a user to search the configuration database 220, display entries, or hide entries using attributes, such as titles, authors, date entered, tags, and/or labels. The GUI can further allow users to rank (e.g., "like", "don't like") entries in the configuration database 220. The measurement configuration server 102 can track usage and ranking of entries in the configuration database 220 and the UI 220 can display in the GUI tracking results of the usage and ranking, such as to indicate popularity. Users may be required to subscribe to the measurement configuration server 102 to access the configuration database 220. Subscribers can be provided with personal accounts to store lists of frequently used entries ("favorites"), track ("follow") usage by other subscribers, and share information with other subscribers.

Figure 4:
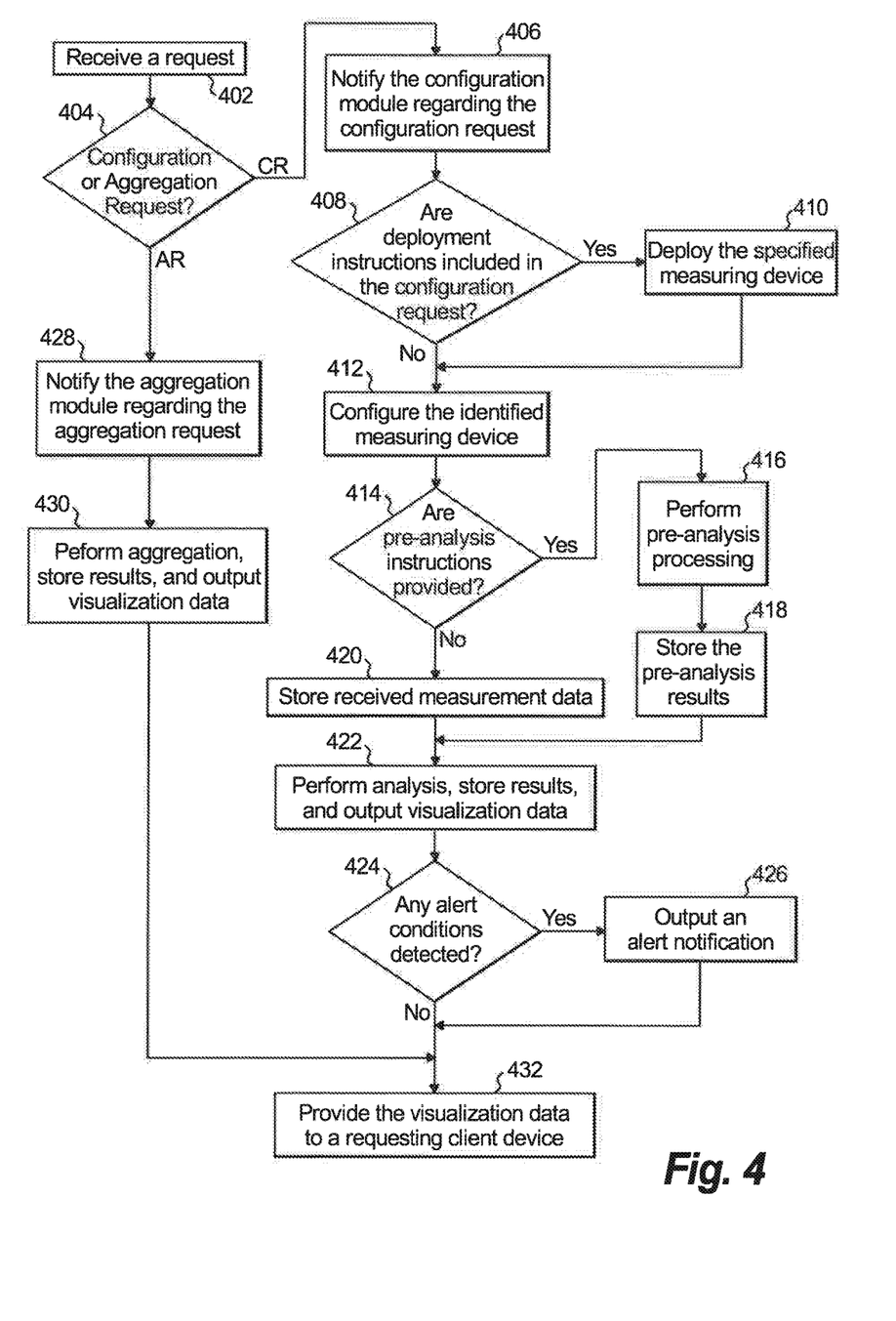
FIG. 4 illustrates a flowchart of operations of a method performed by the measurement configuration system illustrated in FIG. 1 in accordance with illustrative embodiments of the present disclosure.

With reference now to FIG. 4, shown is a flowchart demonstrating implementation of the various exemplary embodiments. It is noted that the order of operations shown in FIG. 4 is not required, so in principle, the various operations may be performed out of the illustrated order. Also certain operations may be skipped, different operations may be added or substituted, or selected operations or groups of operations may be performed in a separate application following the embodiments described herein.

At operation 402, a request is received. At operation 404, a determination is made whether the request is a configuration request or an aggregation request. If the determination at operation 404 is that the request is a configuration request, at operation 406 the configuration module 206 is notified regarding the configuration request. The configuration request can identify one or more measuring devices 104 and specify configuration criteria for configuring the measuring device 104 to perform a test. The configuration criteria can include deployment instructions, pre-analysis instructions, analysis instructions, visualization instructions, and/or aggregation instructions. The configuration request can include the instructions or can identify a stored configuration request that can be accessed from the configuration database 220 by the user configuration interface 202 or the configuration module 206.

At operation 408, a determination is made whether the configuration request includes deployment instructions. If the determination at operation 408 is YES, then at operation 410, the measuring device 104 is deployed at a location of a computer network 130 specified by the deployment instructions.

The method continues at operation 412. If the determination at operation 404 is NO, the method also continues at operation 412. At operation 412, the measuring device 104 is configured to perform measurements and output measurement data in accordance with the configuration instructions. For example, the configuration instructions may specify a characteristic of information transmitted via a network being monitored, and the measuring device 104 may perform measurements upon detection of the characteristic.

At operation 414, it is determined whether the configuration request includes pre-analysis instructions. If the determination at operation 414 is YES, at operation 416 pre-analysis processing is performed on measurement data generated by the measuring device 104, and at operation 418 the results of the pre-analysis are stored in the measurement database 222. If the determination at operation 414 is NO, at operation 420 the measurement data output from the measuring device 104 is stored in the measurement database 122 without pre-analysis, e.g., as raw data.

At operation 422, the analysis module 210 performs analysis processing on the measurement data or pre-analysis results associated with the configuration request. Analysis results are stored in the aggregation database 224 and visualization data results are provided to the user visualization interface 204. The analysis module 210 can be notified when to perform analysis, for example by the configuration module 206 or the measurement database 212. The analysis can be performed upon detection or notification of a condition, such as upon completion of a test, upon updating the measurement database 222, or at regular intervals once measurement data or pre-analysis results are stored in the measurement database 222, etc.

At operation 424, a determination is made whether an alert condition was detected during the analysis. This determination can be made during and/or after the analysis for one or more alert conditions. If the determination at operation 424 is YES, then at operation 426 an alert notification is output to the user visualization interface 204. The method continues at operation 332. If the determination at operation 404 is that the request is an aggregation request, at operation 428 the aggregation module 212 is notified regarding the aggregation request. The aggregation request can specify aggregation criteria, such as data attributes to use for aggregating measurement data and analysis results. The aggregation request can include the aggregation criteria or can identify a stored aggregation request that can be accessed from the configuration database 220 by the user configuration interface 202 or the aggregation module 212.

At operation 430, the aggregation module 212 aggregates measurement data and/or result data stored in the measurement database 222 based on the aggregation criteria and outputs corresponding visualization data that can be used to display the results of the aggregation. At operation 332 the user visualization interface 204 provides the visualization data to the client device 108 so that the client device 108 can display the visualization data.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
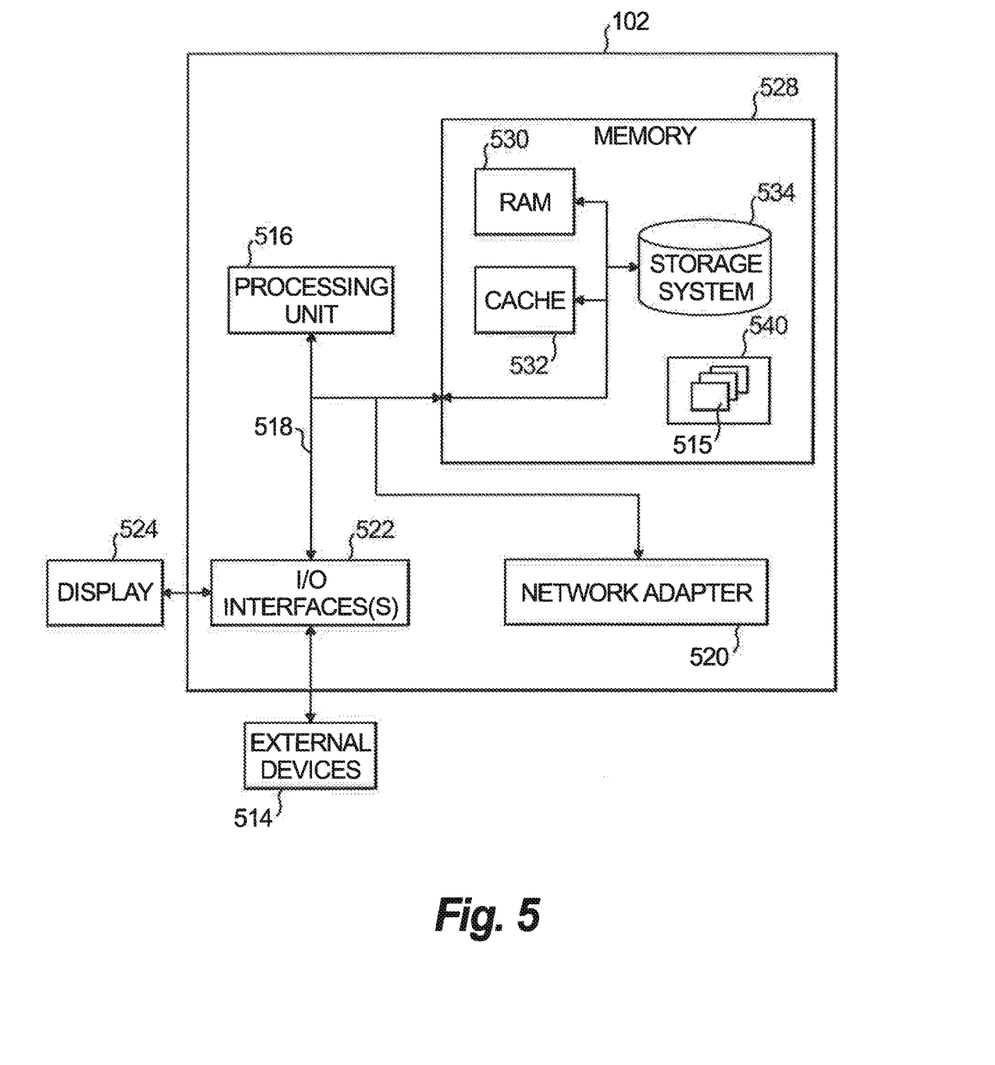
FIG. 5 illustrates internal and external components of a measurement configuration server computer of FIG. 1 in accordance with illustrative embodiments of the present disclosure.

Embodiments of measurement configuration server 102 may be implemented by one or more computer systems. One such computer system, measurement configuration server 102 is illustrated in FIG. 5. In various embodiments, measurement configuration server 102 may be a server, a mainframe computer system, a workstation, a network computer, a desktop computer, a laptop, or the like.

Measurement configuration server 102 is only one example of a suitable system and is not intended to suggest any limitation as to the scope of use or functionality of embodiments of the disclosure described herein. Regardless, measurement configuration server 102 is capable of being implemented and/or performing any of the functionality set forth hereinabove.

Measurement configuration server 102 is operational with numerous other general purpose or special purpose computing system environments or configurations. Examples of well-known computing systems, environments, and/or configurations that may be suitable for use with measurement configuration server 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Measurement configuration server 102 may be described in the general context of computer system-executable instructions, such as program modules, being executed by a computer system. Generally, program modules may include routines, programs, objects, components, logic, data structures, and so on that perform particular tasks or implement particular abstract data types. Measurement configuration server 102 may be practiced in distributed data processing environments where tasks are performed by remote processing devices that are linked through a communications network. In a distributed data processing environment, program modules may be located in both local and remote computer system storage media including memory storage devices.

Measurement configuration server 102 is shown in FIG. 5 in the form of a general-purpose computing device. The components of measurement configuration server 102 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Measurement configuration server 102 typically includes a variety of computer system readable media. Such media may be any available media that is accessible by measurement configuration server 102, and it includes both volatile and non-volatile media, removable and non-removable media.

System memory 528 can include computer system readable media in the form of volatile memory, such as random access memory (RAM) 530 and/or cache memory 532. Measurement configuration server 102 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the disclosure.

Program/utility 540, having a set (at least one) of program modules 515, such as user configuration interface 202, user visualization interface 204, configuration module 206, analysis module 210, aggregation module 212, and deployment module 214 may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 515 generally carry out the functions and/or methodologies of embodiments of the disclosure as described herein.

Measurement configuration server 102 may also communicate with one or more external devices 514 such as a keyboard, a pointing device, a display 524, etc.; one or more devices that enable a user to interact with measurement configuration server 102; and/or any devices (e.g., network card, modem, etc.) that enable measurement configuration server 102 to communicate with one or more other computing devices. Such communication can occur via Input/Output (I/O) interfaces 522. Still yet, measurement configuration server 102 can communicate with one or more networks such as a local area network (LAN), a general wide area network (WAN), and/or a public network (e.g., the Internet) via network adapter 520. As depicted, network adapter 520 communicates with the other components of measurement configuration server 102 via bus 518. It should be understood that although not shown, other hardware and/or software components could be used in conjunction with measurement configuration server 102. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A server to configure a measuring device, the server comprising:
   a memory configured to store instructions;
   at least one processing device disposed in communication with the memory, wherein the at least one processor upon execution of the instructions is configured to:
      receive a configuration request that specifies configuration criteria for configuring a measuring device to perform a test associated with monitoring a network, the configuration criteria including configuration instructions, analysis instructions, visualization instructions, and pre-analysis instructions specifying statistical aggregation to be performed on measurement data obtained by performing the test prior to storage of the measurement data in a measurement database;
      submit the configuration instructions to the measuring device to configure the measuring device to perform at least one of detection and measurements associated with monitoring the network and output measurement data in accordance with the configuration instructions;
      receive the measurement data output by the measuring device;
      perform pre-analysis processing on the measurement data in accordance with the pre-analysis instructions;
      selectively store, as the measurement data, the measurement data received and/or the results of the pre-analysis processing operations;
      process the measurement data stored based on the analysis instructions; and
      output visualization data corresponding to the processed measurement data to a display device based on the visualization instructions.

2. The server of claim 1, wherein the configuration instructions specify programmable instructions that cause the measuring device to perform operations, the operations including at least one of detecting and measuring characteristics of network traffic and/or network performance and outputting the measurement data in a predetermined format.

3. The server of claim 2, wherein the predetermined format uses a JSON data structure.

4. The server of claim 1, wherein the measuring device is a virtual measuring device.

5. The server of claim 4, wherein the configuration criteria further specify a location of a specified computer network at which to deploy the virtual measuring device, and the at least one processor is further configured to deploy the measuring device at the specified location of the specified computer network.

6. The server of claim 1, wherein the configuration instructions specify a characteristic of information transmitted via a network being monitored, and instruct the measuring device to perform the measurements upon detection of the characteristic.

7. The server of claim 1, wherein the configuration criteria include pre-analysis instructions that specify at least one selected field of the measurement data to process prior to storing the measurement data, and wherein storing the measurement data is restricted to storing the at least one selected field.

8. The server of claim 1, wherein the analysis instructions specify alert conditions associated with at least one of the measurement data and results of processing the measurement data, and the at least one processing device is further configured to generate an alert in response to detection of the alert condition.

9. The server of claim 1, wherein the at least one processing device is configured to:
access a measurement database to store measurement data and results of processing measurement data associated with a plurality of tests associated with a plurality of configuration requests performed by different measuring devices and submitted by different users;
receive an aggregation request that includes an aggregation instruction and an aggregation visualization instruction, the aggregation instruction specifying attributes of measurement data and results of processing measurement data stored in the measurement database to include in the aggregation and analysis operations to perform on the data included in the aggregation, the aggregation visualization instructions specifying which aggregation results to display and how to display the aggregation results;
determine data of the at least one of measurement data and results of processing measurement data to include in the aggregation in accordance with the aggregation instructions;
aggregate the data determined using analysis operations specified in the aggregation instruction; and
output visualization data that corresponds to the data aggregated to a display device in accordance with the visualization instructions.

10. The server of claim 9, wherein the different users can access the measurement database to browse, access, compare, and track measurement data and aggregation results.

11. The server of claim 1, wherein the at least one processor is further configured to browse, access, activate, update, and add to a database of configuration requests, the database of configuration requests including configuration requests, configuration instructions, analysis instructions, and visualization instructions, and provide a user interface that communicates with a plurality client devices operated by respective users, the user interface providing the users with the ability to select and/or compose a configuration request from the database of configuration requests.

12. A method to configure a measuring device comprising:
receiving a configuration request that specifies configuration criteria for configuring a measuring device to perform a test associated with monitoring a network, the configuration criteria including configuration instructions, analysis instructions, visualization instructions and pre-analysis instructions specifying statistical aggregation to be performed on measurement data obtained by performing the test prior to storage of the measurement data in a measurement database;
submitting the configuration instructions to the measuring device to configure the measuring device to perform at least one of detection and measurements associated with monitoring the network and output measurement data in accordance with the configuration instructions;
receiving the measurement data output by the measuring device;
perform pre-analysis processing on the measurement data in accordance with the pre-analysis instructions;
selectively storing, as the measurement data, the measurement data received and/or the results of the pre-analysis processing operations;
processing the measurement data stored based on the analysis instructions; and
outputting visualization data corresponding to the processed measurement data for display based on the visualization instructions.

13. The method of claim 12, wherein the configuration criteria further specify a location of a specified computer network at which to deploy the virtual measuring device, and the method further includes deploying the measuring device at the specified location of the specified computer network.

14. The method of claim 12, wherein the configuration instructions specify a characteristic of information transmitted via a network being monitored, and the method further includes instructing the measuring device to perform the measurements upon detection of the characteristic.

15. The method of claim 12 further comprising:
accessing a measurement database to store measurement data and results of processing measurement data associated with a plurality of tests associated with a plurality of configuration requests performed by different measuring devices and submitted by different users;
receiving an aggregation request that includes an aggregation instruction and an aggregation visualization instruction, the aggregation instruction specifying attributes of at least one of measurement data and results of processing measurement data stored in the measurement database to include in the aggregation and analysis operations to perform on the data included in the aggregation, the aggregation visualization instructions specifying which aggregation results to display and how to display the aggregation results;
determining data of the at least one of measurement data and results of processing measurement data to include in the aggregation in accordance with the aggregation instructions;
aggregating the data determined using analysis operations specified in the aggregation instruction; and
outputting visualization data corresponding to the processed measurement data for display based on the visualization instructions.

* * * * *